May 19, 1925.
B. D. SMITH
RECORD CHANGING MECHANISM FOR PHONOGRAPHS
Filed Nov. 12, 1921       6 Sheets-Sheet 1
1,538,667
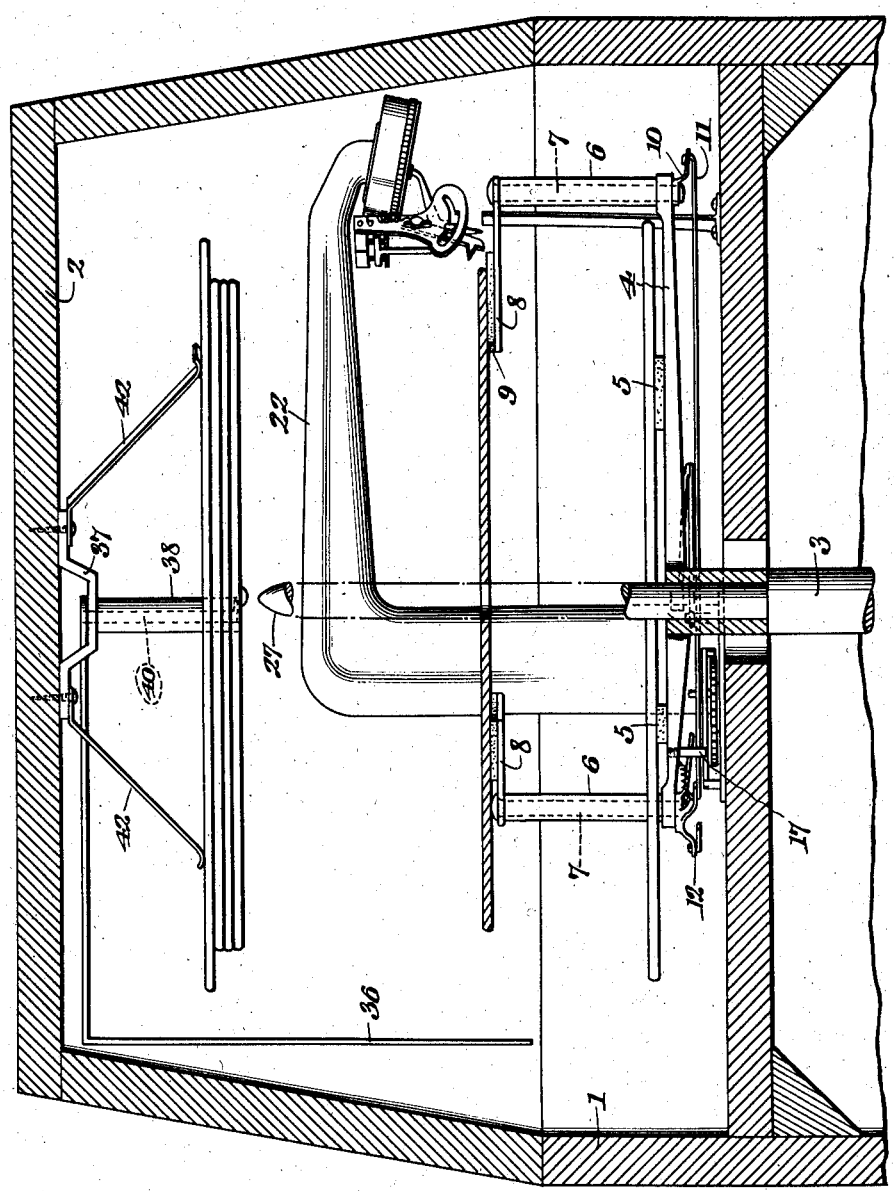
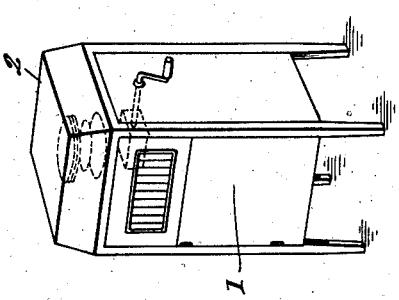

May 19, 1925.

B. D. SMITH 1,538,667

RECORD CHANGING MECHANISM FOR PHONOGRAPHS

Filed Nov. 12, 1921      6 Sheets-Sheet 2

May 19, 1925. 1,538,667
B. D. SMITH
RECORD CHANGING MECHANISM FOR PHONOGRAPHS
Filed Nov. 12, 1921 6 Sheets-Sheet 3

Inventor
B. D. Smith
by his Attorneys
Baldwin & Wight

May 19, 1925.  
B. D. SMITH  
1,538,667  
RECORD CHANGING MECHANISM FOR PHONOGRAPHS  
Filed Nov. 12, 1921 6 Sheets-Sheet 5

Inventor  
B. D. Smith  
by his Attorneys

May 19, 1925.  1,538,667
B. D. SMITH
RECORD CHANGING MECHANISM FOR PHONOGRAPHS
Filed Nov. 12, 1921   6 Sheets-Sheet 6

Inventor
B. D. Smith
by his Attorneys
Baldwin & Wight

Patented May 19, 1925.

1,538,667

UNITED STATES PATENT OFFICE.

BLANCHARD D. SMITH, OF LAGRANGE, GEORGIA, ASSIGNOR OF ONE-HALF TO JOHN AUDLEY GRANT, OF ATLANTA, GEORGIA; ONE-SIXTH TO G. FRED W. MARTIN, OF NEW YORK, N. Y.; AND ONE-SIXTH TO RAY B. WHITMAN, OF BRIDGEPORT, CONNECTICUT.

RECORD-CHANGING MECHANISM FOR PHONOGRAPHS.

Application filed November 12, 1921. Serial No. 514,766.

*To all whom it may concern:*

Be it known that I, BLANCHARD D. SMITH, a citizen of the United States, residing at Lagrange, in the county of Troup and State of Georgia, have invented new and useful Improvements in Record-Changing Mechanism for Phonographs, of which the following is a full, clear, and exact description.

My invention relates to phonographs or similar machines in which a provision is made for automatically playing in succession, a plurality of records without any attention on the part of the operator except that of starting the machine.

One object of my invention is to provide mechanism of the class described which will be simple in construction and applicable to all types of machine employing flat record discs, and can be embodied therein without any substantial changes in the machine itself.

Another object is to provide mechanism which, when one record has been played, will drop said record to an inoperative position, swing the tone arm to one side, drop a new record into place, and then bring the tone arm with its needle into position to begin playing the new record. All these movements are brought about by the power driving the machine, and take place in sequence, as recited.

In the accompanying drawings which illustrate one form of my invention:—

Figure 1 is a perspective view of a conventional cabinet for a phonograph;

Figure 2 is a vertical section through the upper part thereof;

Figure 3:
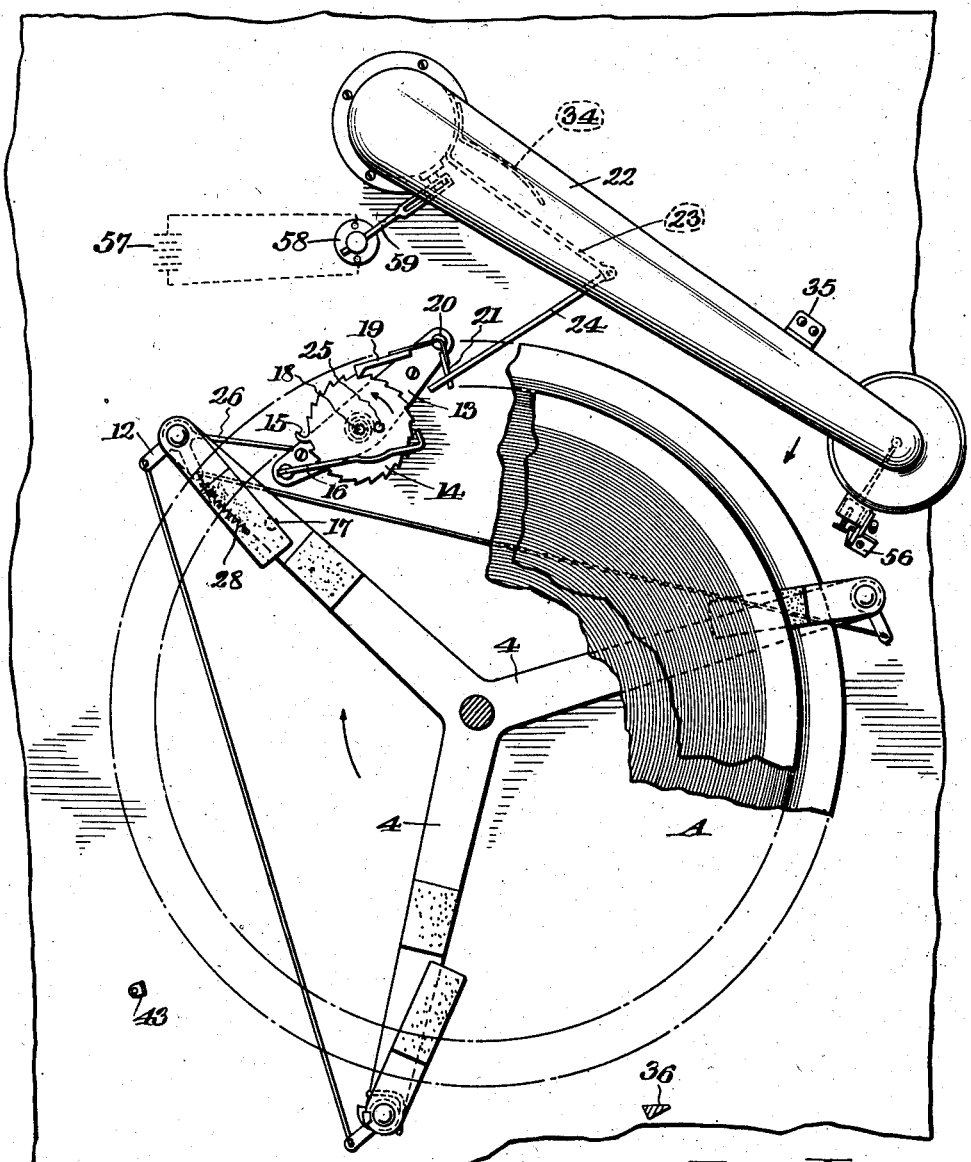
Figure 3 is a top plan view of the position of the parts as the tone arm starts to move into position to play the new record.

The phonograph comprises the usual casing 1 and top 2, and has a vertical shaft 3 which is driven by any suitable motor. Instead of the usual turntable this shaft carries at its top three arms 4, spaced equidistantly. These arms are provided with felt pads 5 upon which rest the records that have been played. Each arm has projecting upwardly from its outer end a sleeve 6 and rotatably mounted within said sleeves are rods 7 which carry at their upper ends relatively short arms 8 also provided with felt pads 9 to support the record while it is being played. Two of the rods 7 are provided at their lower ends beneath the arms 4, with crank arms 10 which are connected by links 11 to similar crank arms 12 on the third rod 7, so that when one rod and the crank arm carried thereby is rotated, the other two rods will be rotated in unison.

The third rod 7 is rotated in the following manner: A bracket 13 is mounted on the framework of the phonograph just underlying the arms 4. This bracket carries a ratchet wheel 14 provided with the usual ratchet teeth and a special tooth 15. A spring pawl 16 is mounted on the bracket and normally lies just out of engagement with the teeth of the ratchet wheel. A depending pin 17 on one of the arms 4 is positioned to engage this pawl 16 on each revolution of the arm and cause it to advance the ratchet wheel the distance of one tooth against the tension of a light spring 18 which tends to revolve the ratchet wheel in clockwise direction. A detent pawl 19 holds the wheel as it is moved step by step through the driving pawl 16. This pawl 19 is pivoted to the bracket 13 at 20 and has integral therewith or fixed thereto an arm 21.

The tone arm 22 has a projecting arm 23 to which is connected a rather heavy rod 24 that rests in a notch in the arm 21. While the machine is playing the tone arm moves inwardly and imparts to the rod 24 a horizontal motion, and the friction is sufficient to move the arm 21 and disengage the holding detent 19 from the teeth of the ratchet wheel 14. The ratchet wheel then rotates under the tension of its spring until the special tooth 15, which projects outwardly a considerable distance beyond the other teeth, engages the end of the arm 21 and stops the ratchet wheel. In other words, the pin 17 rotates the ratchet wheel one step at each revolution of the disc, thus tensioning the spring 18 until the arm or rod 24 has moved sufficiently to release the detent pawl 19, when the wheel is rotated by its spring until stopped by the engagement of the special tooth with the detent pawl, after which the same action is repeated.

Figure 7:
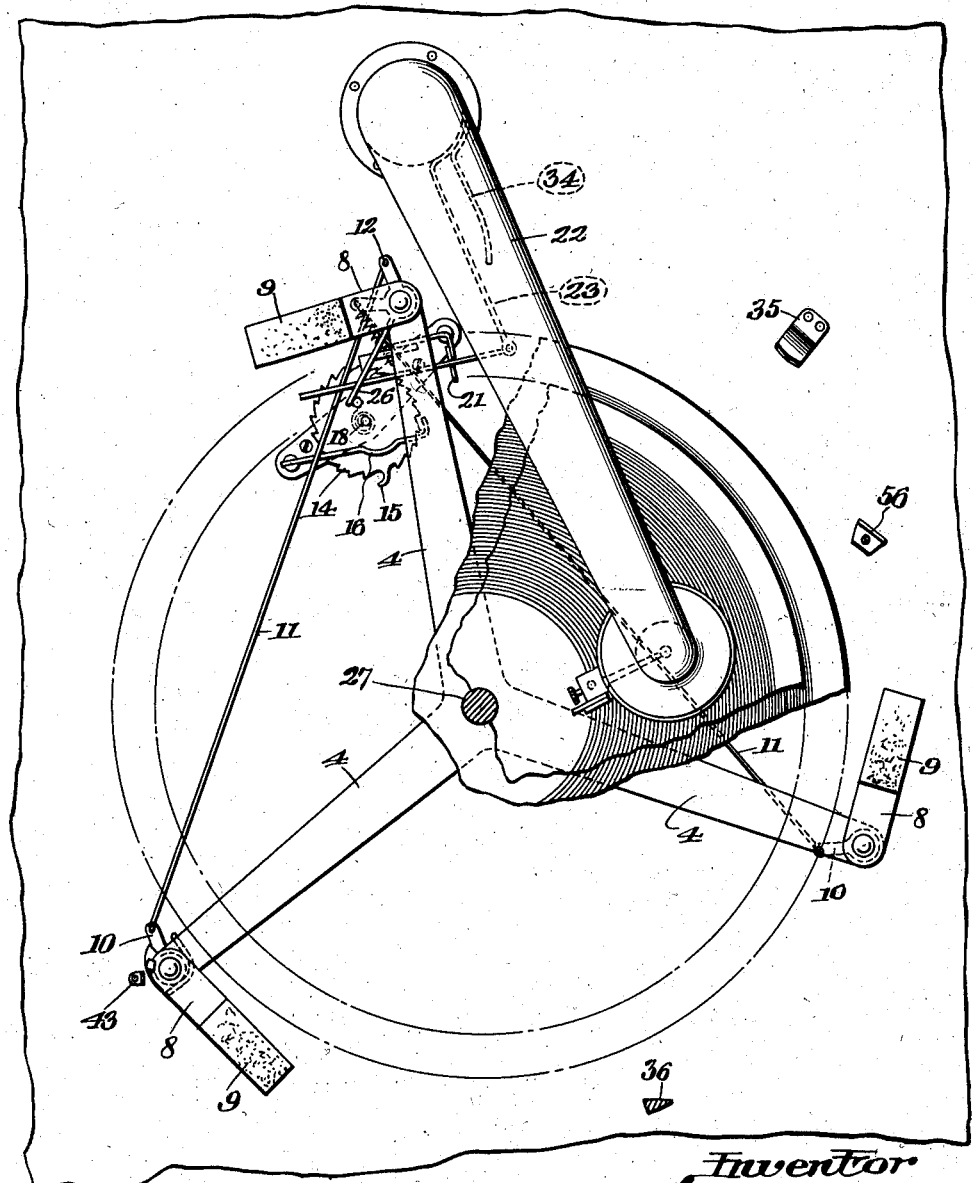
Figure 7 is a plan view similar to Figure 3, but showing the position of the parts just after the record that has been played is dropped to inoperative position.

However, when the record has been finished, subsequent revolutions of the record disc do not move the tone arm and rod 24, and the ratchet wheel is turned until a post 25 carried by said wheel reaches a point farthest from the center of the turntable. This post then engages an arm 26 carried by one of the rods 7, and this rotates the arm 8 carried by this rod, and the other arms 8 by means of the links 11, through an angle of about 90°, or from the position shown in Fig. 3 to that shown in Fig. 7. This drops the record from the arms 8 to a position on the arms 4 or the other records that may have been played and are resting on these arms. It is understood that the records are guided at all times by a center fixed rod 27. After the record is dropped the fingers 8 are returned to position by a spring 28 (Fig. 3).

Surrounding the upper end of one of the sleeves 6 (Fig. 10) is a short sleeve member 29 freely rotatable thereon. It has a hooked projection 30 resting on the associated arm 8 and affording a support for the sleeve 29. Also integral therewith is a projection or trip 31 normally in the position shown in dotted lines in Figure 10, but movable to the position shown in full lines. The sleeve is further provided with depending stop members 32 and 33 which extend downwardly far enough to engage the arm 4. When the record is being played the stop member 33 engages the arm 4, and when the arm 8 is moved outwardly as explained above, the sleeve 29 does not move therewith but remains in the dotted line position of Fig. 10. But when the arm 8 returns, the sleeve moves with it, as the sleeve is resting on said arm and there is then nothing to oppose its movement. The parts are then brought to the full line position of Fig. 10, when the stop 32 engages the arm 4 and prevents further movement. When this projection is thus in its outward position, it performs certain functions as will now be set forth.

Figure 8:
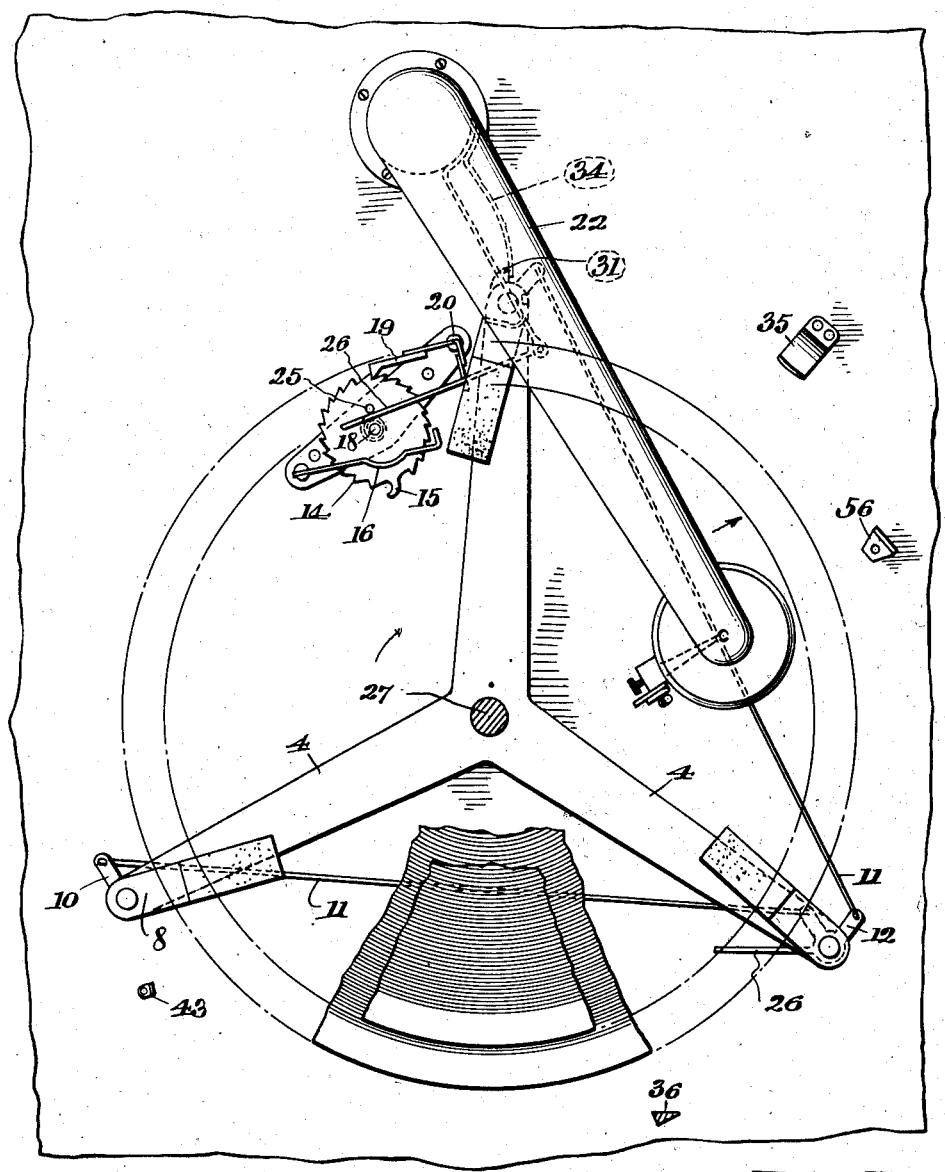
Figure 8 is a similar view of the parts in the position they occupy just following, that of Fig. 7, with the tone arm moving toward the side of the record support.
Figure 9:
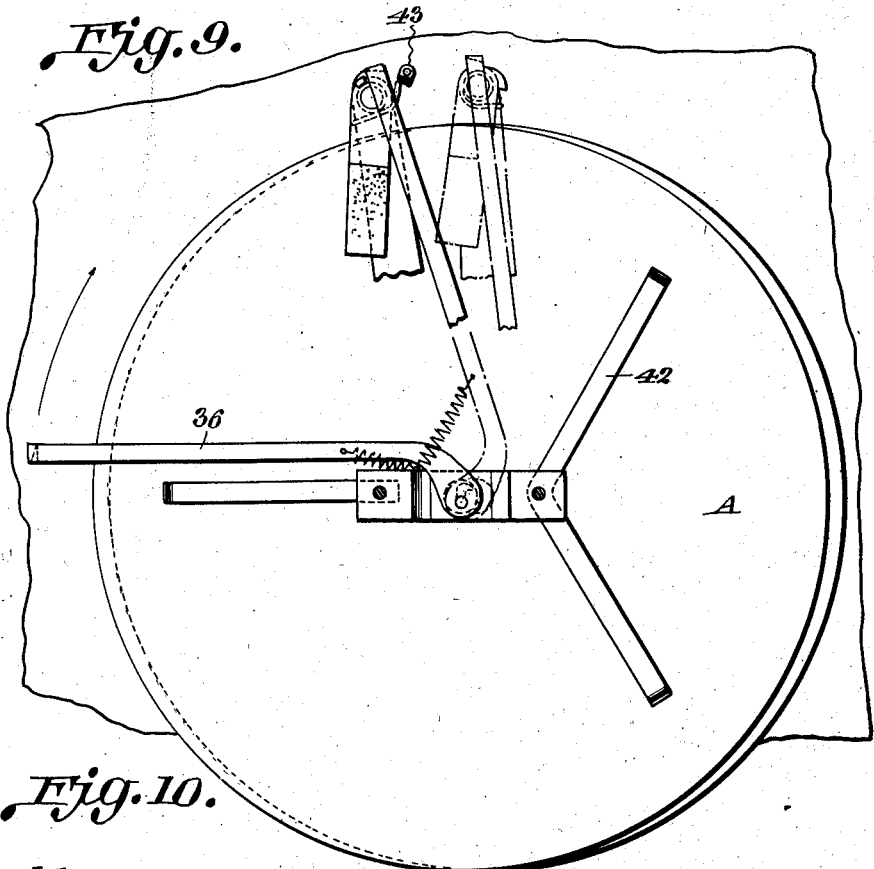
Figure 9 is a somewhat diagrammatic view showing a part of the mechanism for dropping the new record.

After the record just played is dropped and the arm 8 has returned to normal position setting the projection 31, the succeeding revolution of the turn table brings this projection against a springy arm 34 carried by the tone arm (Fig. 8), and swings the tone arm outward to the position shown in Fig. 3. This arm yields to allow the projection 31 to pass, but imparts sufficient momentum to swing the tone arm outwardly. It is understood that the tone arm is pivoted to swing in the usual manner. At the limit of its movement it strikes a fixed stop 35 of a springy nature from which the tone arm rebounds with sufficient force to swing it back over the next record which has in the mean time been drooped into position in a manner hereinafter described. Preferably the tone arm is provided with a light spring (not shown) that tends to swing it toward the center of the record.

Figure 11:
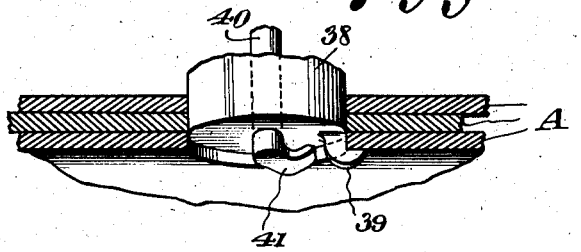
Figure 11 is a detail view showing the reserve records and the mechanism for dropping the lower one.

The projection 31 next strikes a rod 36 and operates the mechanism for dropping a new record into place. (Figs. 2 and 11). Supported by the top 2 of the cabinet is a bracket 37 having a depending sleeve member 38 provided with an outwardly extending lip 39. The member 38 fits within the openings in the centers of the records A quite closely, but the lip 39 which supports the lowermost record projects downwardly from the member 38 the thickness of a record, so that the bottom record is free to move sidewise. Passing through the sleeve member 38 is a rotatable rod 40 connected to and operated by the rod 36. Integral with the lower end of the rod 40 or attached thereto is a cam projection 41 so arranged that if rod 40 is rotated about 90° it will cam the lower record A off of the supporting lip 39 and permit it to drop over the post 27 upon the fingers 8. Light springs 42 attached to the top of the cabinet bear upon the top record and hold the stack in position. Any suitable spring (not shown) may be used to return the rod 40 to normal position.

Figure 10:
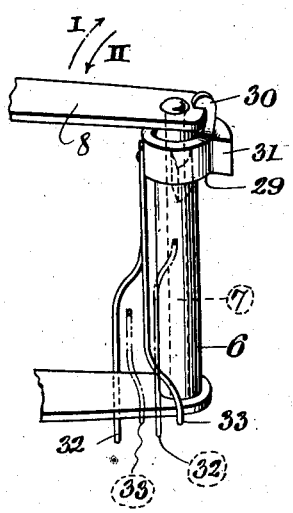
Figure 10 is a detail view of the trip member which operates the mechanism for dropping the old record, swinging aside the tone arm, and dropping the new record, two positions of certain of the parts being shown in full and dotted lines respectively.

After this operation has taken place a fixed stop 43 engages the lower end of the stop arm 32 which projects slightly below the arm 4 and returns the projection 31 to the position shown in dotted lines in Figure 10.

Figure 4:
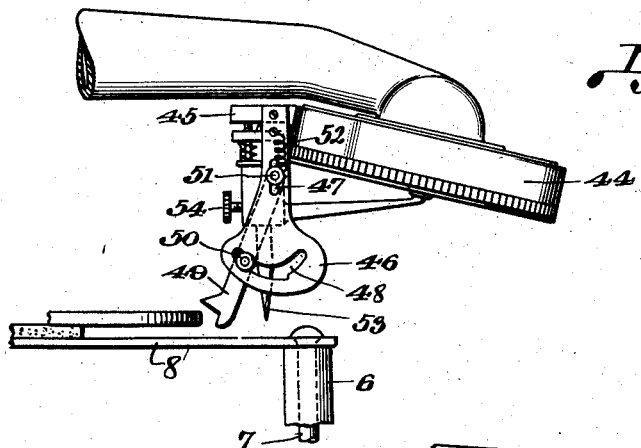
Figures 4, 5 and 6 are similar perspective views showing successive steps in the movement of the tone arm and needle to operative position with relation to the new record.
Figure 5:
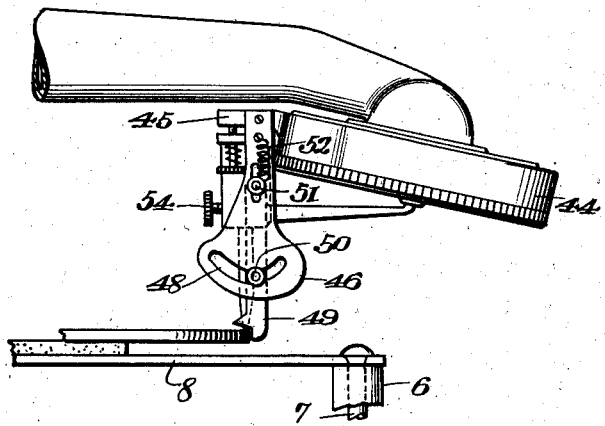
Figure 6:
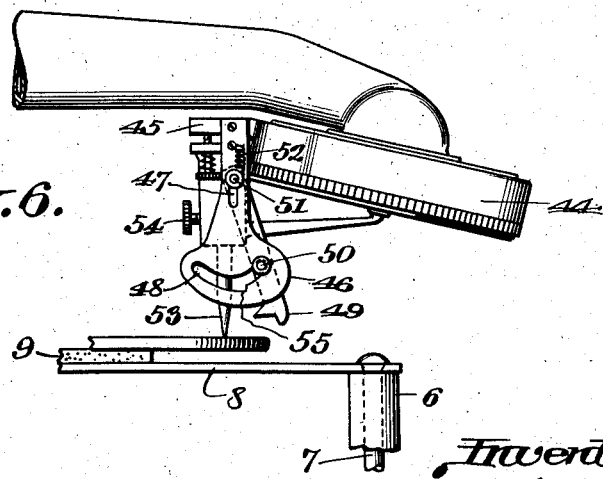

When the tone arm is swung outward to permit the next record to drop into place, the needle drops slightly, and on the return of the tone arm it must be guided into place. This is done by means of mechanism particularly illustrated in Figs. 4, 5 and 6, which show successive steps in this return movement.

Fastened to the sound box 44 is a projection 45 provided with a fixed vertical plate 46. This plate has a short vertical slot 47 and a cam slot 48 in its lower portion. A member 49 is carried by two headed pins 50 and 51 which work in the slots 48 and 47 respectively. A small spring 52 pulls this member upwardly at all times. The needle 53 is held in its support by a set screw 54 in the usual manner. The cam slot 48 has a stop portion 55 which, by engagement with the pin 50, serves to check a too rapid return swing of the tone arm. When the tone arm starts swinging inwardly the parts are in the position of Fig. 4. A slight further movement brings them to a position where the member 49 engages the edge of the record, and a continued movement will raise the diaphragm and needle to the Fig. 5 position where the needle is clear of the record. Upon a still further movement, the member 49 is drawn upwardly by its spring 52 and the lower end, following the cam slot 48, swings outwardly, so that the needle drops into engagement with the record while the member 49 is clear thereof. The parts are now in the Fig. 6 position, and continue therein while the record is being played. When the tone arm is swung outwardly to permit a change of records, the member 49 strikes a fixed stop 56 and moves the parts from the Fig. 6 position to that of Fig. 4. The position of the other parts at this time is shown in Fig. 3.

The phonograph may be driven from a suitable source of electric power, diagrammatically illustrated at 57, and a switch 58 therein is controlled by an arm 59 connected to the tone arm. After the last record is played the tone arm will swing in toward the center, and this will break the circuit, stopping the machine. However, it is obvious that the improvements may be applied to a machine driven in any desired manner.

The operation of the device is as follows. Assuming that a record has just been finished, the tone arm then ceases its inward movement and the ratchet wheel 14 is moved by its driving pawl 16 until the post 25 is brought to a point where it will be engaged by the arm 26. Further movement then results in swinging the arms 8 to the position shown in Figure 7, and the record which has just been played is dropped upon the arms 4. As soon as the arm 26 moves out of engagement with the post 25, the arms 8 are returned to normal position shown in Figs. 3 and 8 by the spring 28. This return movement sets the stop or trip 31 in operative position.

Continued movement of the parts brings this trip 31 against the spring arm 34 carried by the tone arm 22 and moves the latter outwardly to the Fig. 3 position, where it will not interfere with the dropping of the new record into playing position. The trip 31 next engages the rod 36 and through its movement as explained in detail above, drops a new record into place. Just after this operation takes place, the lower end of the stop arm 32 strikes a reset stop 43 and the trip 31 is moved back into inoperative position shown in dotted lines in Fig. 10.

In the meantime the tone arm has started its return movement, the first effect of which is to disengage the pawl 19 from the ratchet 14 and allow it to return to a position where the post 25 is out of the path of the arm 26. The tone arm then passes through the positions shown in Figs. 4, 5 and 6, and the playing of the new record begins.

This sequence of operations continues until the last record has been played, when the inward movement of the tone arm continues until the connection 59 closes the switch 58 and stops the operation of the machine. If for any reason a new record fails to drop into playing position, the inward swinging of the tone arm would stop the driving mechanism in similar fashion.

It is obvious that the invention is not limited to an electrically operated machine, nor to any particular type of phonograph, and that various changes may be made in the specific details without departing from the invention covered by the appended claims.

I claim as my invention:—

1. In a device of the class described, the combination of a rotatable support for used records, vertical sleeves carried thereby, rotatable rods in said sleeves, arms carried by the upper ends of said rods and normally constituting a support for the record that is being played, and means for automatically rotating said rods and thereafter swinging said arms from under the record to permit it to drop upon the first named support.

2. In a device of the class described, the combination of a rotatable support for used records, vertical sleeves carried thereby, rotatable rods in said sleeves, arms carried by the upper ends of said rods and normally constituting a support for the record that is being played, connected crank arms on the lower ends of said rods, an operating arm on one rod, and means brought into position by the rotation of the first named support to engage said operating arm and cause the rods to rotate, thereby swinging the supporting arms from under the record to permit it to drop.

3. In a device of the class described, the combination of a support for the record being played, comprising rotatable rods and arms carried by the upper ends of said rods, means for automatically rotating said rods to move the arms from underneath a record and permit it to drop, and means for preventing the operation of the automatic means until a record has been finished.

4. In a device of the class described, the combination of a bracket, a fixed vertical sleeve carried thereby, a lip carried by the lower end of the sleeve and adapted to support a record, a rotatable rod within said sleeve, a cam finger on its lower end, and means for automatically rotating said rod and thereafter causing the cam finger to slide a record sidewise until it drops off of said lip.

5. In a device of the class described, the combination of a bracket, a fixed vertical sleeve carried thereby and adapted to fit the central openings of a plurality of records, a lip carried by the lower end of the sleeve and adapted to support one of said records, a rotatable rod within said sleeve, a cam finger on its lower end lying within the opening of the lower record, and means for automatically rotating said rod and thereby causing the cam finger to slide a record sidewise until it drops off of said lip.

6. In a device of the class described, the combination with the usual tone arm, of a rotatable support, vertical sleeves carried thereby, a trip carried by one of said sleeves, and means for setting said trip, said trip when set acting to swing said tone arm to an inoperative position.

7. In a device of the class described, the combination with the usual tone arm, and a support for reserve records, of a rotatable support, vertical sleeves carried thereby, a trip carried by one of said sleeves, means for setting said trip, said trip when set acting to swing said tone arm to an inoperative position and then to release a reserve record from said support.

8. In a device of the class described, the combination of a rotatable support, vertical sleeves carried thereby, rotatable rods within said sleeves, arms at the upper ends of said rods, means for rotating said rods to swing the arms outwardly, means to return said arms, a trip set by the return movement of one arm, and means controlled by said trip for placing a new record in operative position.

9. In a device of the class described, the combination with the usual tone arm, of moveable arms, normally supporting the record being played, means for moving said arms to release said record, means for returning said arms, a trip normally set by the return movement of one arm, and means controlled by said trip for moving said tone arm to inoperative position, and then placing a new record upon said arms.

10. In a device of the class described, the combination with the usual tone arm, of movable arms, normally supporting the record being played, means for moving said arms to release said record, means for returning said arms, a trip normally set by the return movement of one arm, means controlled by said trip for moving said tone arm to inoperative position and then placing a new record upon said arms, and means for thereafter resetting said trip to inoperative position.

11. In a device of the class described, the combination with the usual tone arm and needle, of a support for the record being played, means for swinging the tone arm away from said support, and a member carried by the tone arm adjacent the needle and engaging the edge of a record on the support as the tone arm moves toward the support to lift the needle and position the same over the record.

12. In a device of the class described, the combination with the usual tone arm and needle, of a support for the record being played, means for swinging the tone arm away from said support, and a member slidably and pivotally carried by the tone arm adjacent the needle and engaging the edge of a record on the support as the tone arm moves toward the support to lift the needle and position the same over the record, said member then moving to inoperative position.

13. In a device of the class described, the combination with the usual tone arm and needle, of a support for the record being played, means for swinging the tone arm away from said support, a member slidably and pivotally carried by the tone arm adjacent the needle and engaging the edge of a record on the support as the tone arm moves toward the support to lift the needle and position the same over the record, said member then moving to inoperative position, and a fixed stop for moving the member into operative position on the outward movement of the tone arm.

In testimony whereof I have hereunto subscribed my name.

BLANCHARD D. SMITH.